United States Patent [19]

Ryan

[11] Patent Number: 4,708,976

[45] Date of Patent: Nov. 24, 1987

[54] POLYMER COMPOSITIONS CONTAINING MAGNETICALLY SUSCEPTIBLE FILLER

[75] Inventor: Timothy G. Ryan, Chester, England

[73] Assignee: Imperial Chemical Industries Plc, London, England

[21] Appl. No.: 854,705

[22] Filed: Apr. 23, 1986

Related U.S. Application Data

[63] Continuation of Ser. No. 665,346, Oct. 26, 1984, abandoned.

[30] Foreign Application Priority Data

Nov. 10, 1983 [GB] United Kingdom ............... 8329957

[51] Int. Cl.$^4$ .............................................. C08K 3/22
[52] U.S. Cl. ..................................... 523/300; 264/24; 524/431; 524/432; 524/433
[58] Field of Search ............... 523/300; 524/431, 432, 524/433; 264/24

[56] References Cited

U.S. PATENT DOCUMENTS

| | | | |
|---|---|---|---|
| 3,347,815 | 10/1967 | Short et al. ........................ | 524/431 |
| 3,691,130 | 9/1972 | Logvinenko ....................... | 523/300 |
| 3,842,148 | 10/1974 | Loubier .............................. | 264/24 |
| 3,867,299 | 2/1975 | Rohatgi ............................. | 523/300 |
| 3,889,039 | 6/1975 | Wainer ............................... | 524/431 |
| 4,000,229 | 12/1976 | Wainer ............................... | 264/24 |
| 4,321,222 | 3/1982 | Moslener ............................ | 264/24 |
| 4,441,875 | 4/1984 | Saito et al. ........................ | 264/24 |

FOREIGN PATENT DOCUMENTS

| | | | |
|---|---|---|---|
| 0087276 | 8/1983 | European Pat. Off. . | |
| 154707 | 12/1980 | Japan ................................ | 524/431 |
| 857165 | 8/1981 | U.S.S.R. ............................ | 523/300 |

OTHER PUBLICATIONS

Hackh; Hackh's Chemical Dictionary; McGraw-Hill Book Co. Inc.; 3rd Ed., 1944; p. 847.

Primary Examiner—Lewis T. Jacobs
Attorney, Agent, or Firm—Cushman, Darby & Cushman

[57] ABSTRACT

The invention provides a method of influencing the orientation of the polymer molecules in a melt of molecularly orientable polymer by subjecting a composition containing the polymer and a megnetically susceptible filler to a magnetic field of at least 0.005 Tesla prior to or during the formation of a shaped article from the melt. Compositions for use in the invention comprise a thermoplastic polymer and at least 0.05% by weight of a magnetically susceptible filler, particularly a ferrite. The invention is most easily applied to thermotropic polymer compositions.

6 Claims, No Drawings

POLYMER COMPOSITIONS CONTAINING MAGNETICALLY SUSCEPTIBLE FILLER

This is a continuation of application Ser. No. 665,346 filed Oct. 26, 1984, now abandoned.

This invention relates to compositions comprising thermoplastic polymers and magnetically susceptible fillers and to processes of fabricating shaped articles therefrom.

Polymers capable of forming thermotropic melts, that is to say melts which exhibit anisotropic (liquid crystalline) properties over a particular temperature range, have been widely described in recent years. Such polymers form melts in which the rigid, rod-like molecules take up ordered positions in local domains. When these melts are fabricated into shaped articles involving flow processes such as extrusion or injection moulding orientation of the molecules is enhanced along the direction of flow. This results in an increase in the direction of flow, of those properties dependent on the orientation of the polymer molecules, such as tensile strength and flexural strength. At the same time these same properties are reduced in the direction transverse to flow because the proportion of molecules which are not oriented in the direction of flow is reduced. It is of value, depending on the particular application for which the finished article is intended to be able to control, as far as possible, the degree of orientation of the polymer molecules, in a given direction. It is also of value to control the degree of molecular orientation in processes in which non-thermotropic but molecularly orientable polymers are fabricated into shaped articles. Processes and compositions have now been developed which enable greater control of orientation to be achieved.

According to the process of the invention there is provided a method of influencing the orientation of the polymer molecules in a melt of molecularly orientable polymer comprising forming a mixture of the molten polymer and a finely divided magnetically susceptible filler and passing the mixture through a magnetic field prior to or during the formation of a shaped article from the melt. Preferably the magnetic field should have a strength of at least 0.005 Tesla, desirably at least 0.1 Tesla.

The polymer of the composition may be any thermoplastic polymer in which the molecules in a melt of the polymer can be oriented particularly those polymers capable of forming anisotropic melts. A variety of polymer types capable of forming anisotropic melts have been described. For example, anisotropic melt forming polyesters are described in "Liquid Crystal Polymers: I. Preparation and Properties of p-Hydroxybenzoic Acid Copolymers", Journal of Polymer Science, Polymer Chemistry Edition, Vol 14 pp 2043–58 (1976), British Patent Specification No. 1 507 207 and U.S. Pat. No. 4,161,470.

Aromatic polyazomethines and processes of preparing the same are disclosed in U.S. Pat. Nos. 3,493,522; 3,493,524; 3,503,739; 3,516,970; 3,516,971; 3,526,611; 4,048,148; and 4,122,070. Aromatic polyester-carbonates are disclosed in U.S. Pat. Nos. 4,107,143 and 4,284,757.

Aromatic polyester-amides and processes of preparing same are disclosed in U.S. Pat. No. 4,182,842.

The polymer need not necessarily be capable of forming an anisotropic melt and other suitable polymers are those capable of ready molecular orientation under the action of shear applied to a melt, particularly fibre forming polymers such as polyesters, polyamides, polypropylene, polyetherketones, particularly polyetheretherketones.

The magnetically susceptible filler may be any filler which exhibits susceptibility to a magnetic field at a temperature at which the polymer in which it is to be dispersed forms an anisotropic melt. The preferred materials are ferromagnetic materials such as barium, calcium, strontium, lead, zinc and magnesium ferrite and magnetically susceptible metals in the form of powder, flake or fibre.

The magnetically susceptible material should be sufficiently finely divided to be readily dispersed in the polymer and to provide a substantially uniform composition. The maximum particle size of the filler when present as a powder should preferably be below 100$\mu$ and, desirably, at least 95% by number of the particles should have a size less than 10 microns. In the case of flakes or fibres one dimension of the filler will be of the order of 20$\mu$ or less.

Compositions for use in the method of the invention comprise a polymer capable of molecular orientation and at least 0.05% by weight of the composition of a magnetically susceptible, finely divided filler. A preferred polymer composition contains an anisotropic melt forming polymer. Where the shaped article to be prepared is a fibre or a film it is preferred to minimise the concentration of filler in the compositions. Concentrations of less than 5.0% are preferred.

It has been found that the properties of shaped articles formed from the compositions of the invention can be controlled to some extent by the application of a magnetic field to a melt of composition whilst it is being fabricated into an article. Thus if a magnetic field is applied perpendicular to the direction of flow of a thermotropic polymer containing composition an enhancement of orientation in the flow direction is obtained, as indicated by an increase in flexural strength and Charpy Impact strength of a resulting shaped article. This effect can be achieved at very low levels of filler (a very significant effect is observed at a concentration of 0.2% by weight of barium ferrite). The effect is additional to the effect which is generally observed when magnetically inert fillers are present.

The field may be applied to the melt before it is formed into a shaped article or whilst an article is being formed from the melt, particularly whilst the shaped article is solidifying from the melt. The optimum manner of applying the field will depend on the composition being used. Thermotropic compositions, having an ability to retain their molecular organisation over a longer time scale than isotropic melts give a greater freedom of operation. It is generally necessary in the case of non-thermotropic polymer containing compositions to apply the field over that part of the process during which the solidification process starts to occur. The optimum part of the process over which the field should be applied can be readily determined experimentally.

Although the prime purpose of the presence of the magnetically susceptible filler in the composition is to enable molecular orientation to be controlled and the properties to be enhanced the magnetic properties of the filler may also be utilised in the application for which the shaped article is intended. For example, thermotropic polymer containing compositions may be used to mould a magnet. In such applications high concentrations of magnetically susceptible filler are required.

The invention is further illustrated by reference to the following examples.

EXAMPLE 1

Compositions containing the various concentrations of barium ferrite listed in Table 1 below were prepared by compounding a dry blehd of the filler with a wholly aromatic polyester formed in accordance with the teaching of U.S. Pat. No. 4,161,470 and consisting of 73 mole percent of p-oxybenzoyl units and 27 mole percent 6-oxy-2-naphthoyl units. The polyester had an intrinsic viscosity of 6.4 dl/g measured on a 0.1% by weight solution in pentafluorophenol at 60° C. The blend was compounded on a two roll mill at a roll temperature of 300° C. The crepe was chopped into granules.

The product was used to form standard samples for measurement of flexural modulus, flexural strength and unnotched Charpy impact strength by injection moulding at 295° C. using an Austen Allen ram injection moulding machine. A magnetic field of 0.5 Tesla was applied across the mould, perpendicular to the direction of flow of the composition into the mould. Control samples were prepared from the listed compositions but with no magnetic field applied. The results obtained are listed below.

TABLE 1

| 0.5 T Field | Barium Ferrite (% wt) | Flex* Modulus (GPa) | Flex** Strength (MPa) | Charpy Impact*** Strength (KJm$^{-2}$) |
|---|---|---|---|---|
| OFF | — | 7.3 | 154 | 11.2 |
| ON | — | 7.2 | 153 | 11.6 |
| OFF | 0.2 | 7.4 | 155 | — |
| ON | 0.2 | 8.0 | 170 | — |
| OFF | 1.0 | 7.7 | 168 | 13.5 |
| ON | 1.0 | 8.6 | 168 | 21.1 |
| OFF | 5.0 | 8.8 | 169 | 19.6 |
| ON | 5.0 | 9.2 | 165 | 24.9 |

*measured according to ASTM D 790
**measured according to ASTM D 790
***measured according to ASTM D 256

The results show increases in flexural modulus, flexural strength and Charpy Impact Strength at low levels of barium ferrite when the field is applied. At higher levels (5.0% by wt) the effect due to the field becomes less significant in relation to effects produced by the presence of the filler in the melt although the effect on impact strength of the applied field is still very significant.

EXAMPLE 2

A composition containing 0.25% by wt of barium ferrite (Embedding Powder 304) obtained from Ferro Corporation having an average particle size of 1.8 microns was prepared by compounding a dry blend of the filler with the wholly aromatic polyester used in Example 1. The compounding was performed using a Gays (Hampton) Ltd TS40 twin-screw compounding extruder.

The ferrite containing composition was spun into fibre using a lab melt spinner having a filter pack containing 1836 sand fitted with an 18 mm diameter single screw and a die of diameter 0.5 mm.

The spinning temperature was 310° C. The fibre was hauled off at 183 m/min. In a subsequent experiment the haul-off was increased to 457 m/min. A magnetic field was applied across the fibre perpendicular to the spinning direction over a length of 71 cm. The field was positioned so that there was a gap of 16 cm between the die and the start of the field so that solidification of the fibre commenced whilst within the field. The field was obtained using a stack of seven pairs of electromagnets positioned to have a 7 mm gap between the pole pieces, the fibre being drawn through the tap. The field was measured using an LDJ Electronics gaussmeter (Model 511) as 0.01 to 0.05 Tesla. Control samples were prepared with no applied magnetic field and with no magnetic filler present. The results obtained are given in Table II.

TABLE II

| Field | Barium ferrite (% by wt) | Haul off Rate m/min | Fibre Diam. (micron) | Draw Ratio | Tenacity (g/denier) | Youngs Modulus (g/denier) |
|---|---|---|---|---|---|---|
| Off | 0 | 183 | 94 | 28 | 39 | 3425 |
| On | 0 | 183 | 94 | 28 | 34 | 3300 |
| Off | 0.25 | 183 | 140 | 13 | 30 | 3476 |
| On | 0.25 | 183 | 140 | 13 | 41 | 3860 |
| Off | 0.25 | 457 | 67 | 56 | 41 | 4280 |
| On | 0.25 | 457 | 67 | 56 | 48 | 4516 |

There is a well known relationship between modulus and tenacity and draw ratio but superimposed on this effect it can be seen that a significant increase in modulus and tenacity has been obtained as a result of the presence of ferrite and the application of the field.

EXAMPLE 3

A composition containing 0.25% by weight of the ferrite used in Example 2 was compounded with a polyethylene terephthalate grade EX 148 (containing 2% $TiO_2$) having an IV of 0.67 deciliters/g at 285° C.

The composition was spun into fibres using the procedure of Example 2 except in that the die diameter was 380 microns. The throughput was 1.36 g/min and the haul off rate was 990 m/min. The spinning temperature was 288° C.

A magnetic field was obtained as described in Example 2 except that the field was situated 37 cm below the die.

Birefringence of the fibre before and after applying the field was obtained by dividing the optical retardation measured using a Berek compensator by the filament diameter.

The results obtained are given in Table III.

TABLE III

| Field | Haul Off Rate (m/min) | Fibre Drain (micron) | Draw Ratio | Birefringence × 10$^{-3}$ |
|---|---|---|---|---|
| Off | 990 | 33 | 128 | 4.18 |
| On | 990 | 33 | 128 | 4.75 |

The table shows a significant increase in orientation as a result of applying the field.

I claim:

1. A method of influencing the orientation of the polymer molecules in a thermotropic melt comprising forming a molten mixture of a polymer capable of forming a thermotropic melt which exhibits anisotropic (liquid crystalline) properties and 0.05% to 5.0% by weight of the mixture of a finely divided magnetically susceptible filler and passing the mixture through a magnetic field prior to or during the formation of a shaped article from the melt.

2. A method according to claim 1 wherein the field strength is at least 0.005 Tesla.

3. A method according to either of claims 1 or 2 in which the field is applied to a shaped article formed from the mixture over the period during which the article commences solidification from the melt.

4. A method according to claim 1 or 2 in which the magnetically susceptible filler is a metal ferrite.

5. A composition for uses in the method of any one of claims 1 or 2 comprising a thermoplastic polymer capable of forming a thermotropic melt which exhibits anisotropic (liquid crystalline) properties and from 0.05% to 5.0% by weight of a magnetically susceptible filler.

6. A composition according to claim 5 in which the magnetically susceptible filler is selected from barium, calcium, strontium, lead, zinc and magnesium ferrites.

* * * * *